United States Patent Office 3,362,970
Patented Jan. 9, 1968

3,362,970
MAGNESIA-FATTY ACID ADDUCTS AND PROCESS FOR THE PREPARATION THEREOF
Richard A. Patton, Arlington Heights, Ill., assignor to Morton International, Inc., a corporation of Delaware
No Drawing. Filed July 28, 1964, Ser. No. 385,786
6 Claims. (Cl. 260—413)

This invention relates to novel magnesium oxide compositions and more specifically to organically modified magnesias, and to methods of producing the same.

The compositions of the present invention have utility as reinforcing fillers for elastomeric products, particularly synthetic elastomers such as neoprene and the like; as readily dispersible turbine hydrocarbon fuel oil additives which furnish MgO to combine with vanadic oxide formed in the fuel combustion process to form infusible vanadium compounds (magnesium vanadates) and thereby reduce corrosion of the turbine alloy parts; and as ingredients of metal working and metal drawing compositions. The products of this invention are more compatible with organic, elastomeric and petroleum compositions than unmodified magnesia.

Magnesium oxide, or more conventionally magnesia, is a well known commodity of commerce. Magnesia may be prepared from a number of natural minerals. Magnesite (magnesium carbonate) may be calcined directly to magnesia. When this is done, a high density magnesium oxide of coarse particle size results. Brucite, naturally occurring magnesium hydroxide, may also be calcined directly to magnesium oxide. Once again high density, coarse particle magnesium oxide results. Dolomite, because of the presence of calcium oxide, requires treatment to separate the alkaline oxides after calcining. This may be done by treatment of the quicklime with carbon dioxide to solubilize the magnesium component as the bicarbonate. Filtration and washing will then produce a liquor which may, by heat, be decomposed to a basic magnesium carbonate. The basic carbonate may then be calcined to magnesium oxide. This is the process that has been employed to produce insulating magnesia.

The production of magnesium oxide from seat water or brine involves the lime treatment of the magnesium-containing solution. A high calcium lime will precipitate magnesium hydroxide producing a soluble salt of the calcium in the process. In the instance of dolomite, the calcium oxide component of dolomite will react with soluble magnesium chloride to produce insoluble magnesium hydroxide and soluble calcium chloride. While it is possible to produce a high surface area magnesia from naturally occurring materials, the highest surface areas and the most reactive magnesias are produced by calcination of precipitated fine particle materials. These may be either magnesium carbonate or magnesium hydroxide. For purposes of this invention, any active magnesia, regardless of origin, is a suitable raw material. It is preferred, however, to employ the finer particle size precipitated materials.

If the calcination step is carried out at more moderate temperatures, the product produced is less crystalline and more amorphous in character than periclase. This magnesia may be used in a variety of industrial applications, such as a curing aid for elastomers, the manufacture of cements, metal coatings and other well known uses. The product may be characterized as a lightly calcined magnesia.

It has been found as an unexpected phenomenon that many of the lightly calcined magnesias of commerce have unusual properties which are not common to the hard calcined periclase or the starting materials from which magnesias are prepared, namely, the hydroxide or the carbonate. One characteristic of these lightly calcined magnesias is the ability to adsorb iodine. It has been found that magnesias, having an iodine adsorption value of from 10 to about 300 milligrams per gram, are capable of reacting with certain broad classes of organic compounds to produce an organically modified magnesia. The reactivity of these magnesias is highly unexpected in view of the fact that the starting material, such as magnesium hydroxide, is unreactive with respect to these organic compounds. It has been found that magnesias having iodine adsorption values below 10, such as periclase, are unreactive.

Inasmuch as magnesia is often used in conjunction with organic or hydrocarbon derived materials, it would be desirable, if a product could be produced which would modify the purely inorganic characteristic of magnesia, to produce a material which is more compatible with organic compositions.

Accordingly, in one broad form, the compositions of the present invention are prepared by reacting a lightly calcined magnesium oxide having an iodine adsorption number of from 10 to 300 with a fatty acid selected from the group consisting of monobasic fatty acids containing up to 26 carbon atoms, dimerized unsaturated $C_{18}$ fatty acids, trimerized unsaturated $C_{18}$ fatty acids, and mixtures thereof.

As the term is used herein, $C_{18}$ fatty acids are unsaturated 18 carbon atom fatty acids, such as oleic, linoleic, linolenic, licanic and ricinoleic acids. Dimerization results in a dibasic 36 carbon atom acid and trimerization results in a tribasic 54 carbon atom acid. Ordinarily the dimerization and trimerization results in mixtures of monomeric $C_{18}$ unsaturated acid, as well as the dimer and trimer as noted above.

The magnesia starting material is a commercially available product which is sold under a variety of trade names.

As indicated in the foregoing, the magnesia starting materials of the present invention have an iodine adsorption number of value of from about 10 to about 300 milligrams of iodine per gram of dry magnesium oxide, and in the most preferred instance an iodine number of from about 15 to about 220. The iodine number as referred to herein is determined by the following procedure:

METHOD OF IODINE NUMBER DETERMINATION (1) Weigh a 2 gram sample of magnesium oxide to the nearest milligram.
(2) Transfer to a clear, dry, 200-ml. glass-stoppered bottle.
(3) Add 100±0.2 ml. of 0.100 N iodine in carbon tetrachloride, free from traces of sulfur or carbon disulfide.
(4) Stopper the bottle and shake vigorously at ambient temperature in a suitable shaking device for 30 minutes (the test is relatively insensitive to temperature so that no temperature controls are employed).
(5) Allow to settle for 5 minutes and then pipette a 20 ml. aliquot of the clear solution into a 250 ml. Erlenmeyer flask containing 50 ml. of 0.03 N potassium iodide in 75 percent ethanol.
(6) Titrate the 20 ml. aliquot with standard 0.05 N sodium thiosulfate. The sodium thiosulfate should be standardized at least once every two weeks against a standard potassium iodate solution. A sharp end point is obtained without the use of starch indicator.
(7) Calculate iodine number in terms of milligrams of iodine per gram of sample according to the following equation:

$$(V_2 - V_1)\frac{127 \times N_1}{0.4} = \text{milligrams/g.} = \text{iodine number}$$

where $V_2$ is the volume of thiosulfate equivalent to 20 ml. of the original iodine solution—before adsorption of iodine by the oxide; where $V_1$ is the volume of thiosulfate required by the 20 ml. aliquot after the adsorption; and $N_1$ is the normality of the thiosulfate solution.

The monobasic fatty acids which are operative in the present invention are: Butyric acid, $CH_3(CH_2)_2COOH$; isovaleric acid, $(CH_3)_2CHCH_2COOH$; caproic acid, $CH_3(CH_2)_4COOH$; caprylic acid, $CH_3(CH_2)_6COOH$; capric acid, $CH_3(CH_2)_8COOH$; lauric acid, $$CH_3(CH_2)_{10}COOH$$

myristic acid, $CH_3(CH_2)_{12}COOH$; palmitic acid,

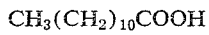
$$CH_3(CH_2)_{14}COOH$$

stearic acid, $CH_3(CH_2)_{16}COOH$; arachidic acid,

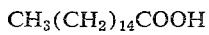
$$CH_3(CH_2)_{18}COOH$$

behenic acid, $CH_3(CH_2)_{20}COOH$; lignoceric acid,

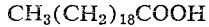
$$CH_3(CH_2)_{22}COOH$$

and cerotic acid, $CH_3(CH_2)_{24}COOH$. In addition, unsaturated monobasic fatty acids, as exemplified by oleic acid, $CH_3(CH_2)_7CH=CH(CH_2)_7COOH$, are likewise operative and included within the inventive concept of the present process.

The mixtures of dibasic and tribasic fatty acid reactants referred to above are known commercially as "dimer" and "trimer" acids, respectively, and are commercially available under the trademark "Empol." "Dimer" acids which may be employed in this invention, contain from 75 to 95 percent by weight of dibasic acids containing 36 carbon atoms, and from about 4 to 25 percent by weight of tribasic acids containing 54 carbon atoms, and up to 3 percent by weight of monobasic 18 carbon atom acids. The "trimer" acids consist essentially of approximately 90 percent by weight of tribasic acids containing 54 carbon atoms and approximately 10 percent by weight of dibasic acids containing 36 carbon atoms.

The exact chemical structure of these dimer and trimer acids is not known. They are best characterized by reference to their chemical and physical constants which are as follows:

|  | Dimer Acids | Trimer Acids |
| --- | --- | --- |
| Acid Value | 182–196 |  |
| Saponification Value | 190–200 | 192–202. |
| Neutralization Equivalent | 285–300 | 290–305. |
| Color | 11 Max.(Gardner) | Dark brown. |
| Specific Gravity: |  |  |
| At 29° C |  | 0.949–0.960. |
| At 15.5° C./15.5° C | 0.95 |  |
| At 25° C./20° C | 0.94 |  |
| Refractive Index at 60° C | 1.4700–1.4760 | 1.4825–1.4835. |
| Flash Point | 520–620° F | 595–600° F. |
| Fire Point | 590–625° F | 675–685° F. |
| Viscosity, centipoises at 25° C |  | 65,000. |
| Viscosity: |  |  |
| Centistokes at 100° C | 50–100 |  |
| Gardner Holdt at 25° C | Z–1 to Z–5 |  |
| Monobasic 18 Carbon Acids | 3% Maximum |  |
| Dibasic Acids: Resulting from the polymerization or dimerization of naturally occurring $C_{18}$ unsaturated fatty acids. | 75 to 95% | Approx. 10%. |
| Tribasic Acids: Resulting from the polymerization or trimerization of naturally occurring $C_{18}$ unsaturated fatty acids. | 4 to 25% | Approx. 90%. |
| Solubility | Soluble in alcohol, ether, benzene, acetone and naphtha. | Soluble in alcohol, ketone, and ethers, partially soluble in mineral spirits. |

The products of the present invention may be prepared as indicated above by reacting a lightly calcined magnesia as previously defined with a fatty acid. Generally, the reaction is carried out in an inert organic solvent selected from the group consisting of aromatic hydrocarbons, aliphatic hydrocarbons and chlorinated hydrocarbons at a temperature ranging from ambient temperature to the reflux temperature of the particular solvent employed. The reaction may be carried out by admixing the reactants at ambient temperature in an inert solvent such as benzene, toluene, petroleum ether or trichloroethylene and thereafter separating the product from the solvent. Alternately, the reaction may be effected by dissolving the fatty acid in the solvent, adding magnesia and refluxing the admixture for from 1 to 3 hours, filtering and drying the solid product. The quantity of solvent used is not critical as the solvent does not enter into the reaction and merely serves as a convenient medium for the reaction. Generally, in the procedure in which the admixture is refluxed, approximately 500 to 700 cc. of solvent are adequate for about 100 to 200 grams of reactants.

The time of reaction is not critical and times of about one-half hour to about twenty-four hours or more may be used depending upon the mode of reaction. In those instances were the magnesia and fatty acid are reacted under reflux conditions, the course of the reaction may be followed by the evolution of water, the end of the reaction being indicated by the cessation of water evolution. The water produced in the reaction may be collected and measured in a Dean-Stark trap or similar apparatus.

When the reaction is complete, the reaction product is removed by filtration and washed with a volatile solvent to remove any excess organic reactant. Solvents for washing may be any inert material substantially of the same type as are used for the reaction medium. After washing, the filter cake is dried, preferably at temperatures of from between about 65 and 100° C. and pulverized into a powder. Alternately, the reaction product may be freed of its solvent by a vacuum technique followed by subsequent drying and pulverization.

The adducts have an organic content of from about 1 to 25 percent by weight.

The following specific examples will further illustrate the process for producing the compositions of the present invention.

*Example 1*

Into a 3-liter, 3-necked flask, equipped with a thermometer, stirrer and reflux condenser with attached Dean-Stark trap, are placed 550 milliliters of dry toluene solvent and 25 grams of caproic acid. To this are added 100 grams of magnesium oxide having an iodine adsorption number of 128. This reaction mixture is then refluxed at a temperature of 110 to 112° C. for a period of approximately 1½ hours. At the end of this time, the solvent is removed by vacuum and the product dried overnight at a temperature of from 70 to 80° C. to constant weight. This procedure yields a caproic acid-magnesia adduct weighing approximately 123.7 grams and having an organic content of 17.7 percent by weight.

The following examples illustrate the production of similar products by the method of Example 1 using various fatty acids:

| Example No. | Magnesium Oxide | | Fatty Acid | Amount (grams) | Product (grams) | Solvent | Solvent Removal | Weight Percent Organic in Product |
| --- | --- | --- | --- | --- | --- | --- | --- | --- |
|  | Amount (grams) | Iodine No. |  |  |  |  |  |  |
| 2 | 100 | 128 | Caprylic | 25 | 123.2 | Toluene | Vacuum | 19.6 |
| 3 | 100 | 128 | Capric | 25 | 123.4 | do | do | 20.0 |
| 4 | 115 | 119 | Lauric | 25 | 139.3 | Trichloroethylene | do | 17.9 |
| 5 | 100 | 128 | Palmitic | 25 | 123.8 | Toluene | do | 21.4 |
| 6 | 115 | 114 | Stearic | 20.3 | 133.4 | Trichloroethyl | do | 15.2 |
| 7 | 230 | 119 | Oleic | 50 | 278.0 | Trichloroethylene | do | 17.9 |

Example 8

Into a 3-liter, 3-necked flask, equipped with a thermometer, stirrer and reflux condenser with attached Dean-Stark trap, are placed 500 milliliters of dry toluene solvent and 50 grams of a dimer acid hereinbefore described and sold under the tradename of Empol 1018. To this are added 230 grams of magnesium oxide having an iodine adsorption number of 100. This reaction mixture is then refluxed at a temperature of from about 110° C. to about 115° C. for approximately 2 to 3 hours. At the end of this time, the mass is cooled, filtered, washed and dried to constant weight at a temperature of from about 70 to about 80° C. This procedure yields a magnesium oxide dimer acid adduct having an organic content of about 18.2 percent by weight. The following examples illustrate the production of various other dimer and trimer adducts of magnesium oxide by the process of Example 8:

| Example No. | Magnesium Oxide Amount (grams) | Magnesium Oxide Iodine No. | Fatty Acid | Amount (grams) | Percent by Weight of Organic Component in Product |
|---|---|---|---|---|---|
| 9 | 230 | 107 | Dimer acid [1] | 41.5 | 15.4 |
| 10 | 340 | 116 | do.[2] | 75.0 | 17.8 |
| 11 | 258 | 119 | do.[2] | 57.2 | 17.8 |
| 12 | 230 | 116 | Trimer acid [3] | 50.0 | 18.0 |

[1] Empol 1014.  [2] Empol 1022.  [3] Emery 3162-D.

As is seen from the foregoing specific examples, the organically modified magnesias of this invention may be further characterized as containing from about 15 to 25 percent by weight of organic material. The organic modification of the purely inorganic character of magnesia results in a composition that is more compatible with hydrocarbon derived materials, and particularly suitable for use as a filler, reinforcing agent, adjuvant or the like in such organic compositions as fuel oils, lubricants, elastomers, polymers, plastics and similar materials.

As indicated in the foregoing, the products of the present invention are useful as readily dispersible hydrocarbon fuel oil odditives, and as components of metal spinning and metal drawing compositions. As hydrocarbon fuel oil additives, these compositions have the capability of reducing corrosion of turbine alloy parts with which fuel oil comes into contact. Fuel oils typically contain approximately 200 to 500 parts per million of vanadium which is converted to vanadic oxide ($V_2O_5$) upon combustion. This oxide is fusible at the temperatures generally attained within a gas turbine or boiler. Impingement of the fused vanadic oxide on the turbine blades or boiler tubes leads to spot solution of the metal by the molten oxide with subsequent deterioration of the equipment. In addition, these fuels also contain appreciable amounts of sulfur which is oxidized in the combustion process to acidic gases having corrosive properties. Incorporation of magnesia in the fuel oil provides a reagent which combines with or scavenges the vanadic oxide to produce harmless magnesium vanadate which is readily conveyed out of the combustion chamber by the fuel gases. If excess magnesia is incorporated, it serves to render harmless the acidic sulfur oxides by combination therewith to form magnesium sulfate. For example, 7.5 grams of a stearic acid-magnesium oxide adduct, prepared as described in Example 6, is added to 742.5 grams of carbon tetrachloride. This forms a suspension which is stable for from 3 to 5 weeks and which may be incorporated into a fuel oil which normally contains a few hundred parts per million of vanadium with the end result that the adduct effectively inactivates the vanadium and thereby alleviates the corrosion problem. Unmodified magnesium oxide settles rapidly when added to carbon tetrachloride.

As an example of the usefulness of the present compositions in metal spinning, the following base composition is prepared as typifying a metal spinning lubricant:

PART A

|   | Parts |
|---|---|
| Stearic acid | 8 |
| Oleic acid | 16 |
| Distilled tallow fatty acids | 6 |

PART B

|   | |
|---|---|
| Sodium hydroxide 35° Baumé solution | 6 |
| Water | 26 |

The ingredients of Part A are melted together. To this melt is added Part B and the resultant mixture is heated to a temperature of 180° F. and kept at this temperature for 10 minutes to allow for complete saponification.

This base composition is divided into three equal parts. To one part is added 20 percent by weight of mica. To a second part is added 20 percent by weight of lithopone and to a third part is added 15 percent by weight of a magnesium oxide-dimer acid adduct prepared as in Example 11. Each of these compositions so prepared was used as a lubricant in spinning metal, employing a Le Blond spinning lathe and a cup of mild carbon steel having a thickness of 1/16 of an inch. The speed of revolution of the work was 1000 r.p.m. and the diameter of the cup was 2¼ inches. The above mica and lithopone-containing compositions are considered representative of good commercial lubricants for this purpose. Under the conditions of this test, the composition containing the magnesium oxide-dimer acid adduct worked well and did not drag. The surface finish was better than that obtained by the mica based composition and comparable to the analogous lithopone composition.

The products of the present invention also display utility as components of lubricants used for wire drawing. To illustrate, the same base lubricant composition as described above is prepared. The base is divided into three equal parts. To one part is added 10 percent of the magnesium oxide-trimer acid adduct of Example 12, to a second part is added 10 percent of a tall oil-magnesium oxide admixture, and 10 percent of lithopone is added to the third part. These compositions were each used to lubricate a wire drawn through a jeweler's drawplate which consists of a hardened steel plate with countersunk

| Pounds to Draw Wire Through Drawplate | Added Component of Lubricant | Original Wire Size (inch) | Drawn Wire Size (inch) | Composition Of Wire |
|---|---|---|---|---|
| 65 | MgO-Trimer Acid Adduct | 0.113 | 0.107 | Aluminum. |
| 95 | Tall Oil and MgO Admixture | 0.113 | 0.107 | Do. |
| 105 | Lithopone | 0.113 | 0.107 | Do. |
| 45.5 | MgO-Trimer Acid Adduct | 0.080 | 0.076 | Copper. |
| 52.5 | Tall Oil and MgO Admixture | 0.080 | 0.076 | Do. |
| 47.5 | Lithopone | 0.080 | 0.076 | Do. |
| 25 | MgO-Trimer Acid Adduct | 0.0425 | 0.0415 | Mild Steel. |
| 30 | Tall Oil and MgO Admixture | 0.0425 | 0.0415 | Do. |
| 31 | Lithopone | 0.0425 | 0.0415 | Do. | holes with diameters of wire size 1 through 30 gauge. To reduce a wire in size it is tapered on one end and drawn through the next smallest hole until the desired diameter is obtained.

The drawplate was fastened in the jaws of a tensile tester, the wire suitably tapered and inserted through the proper hole in the drawplate and fastened in the other jaws of the tester. The drawing compound was brushed on the wire as it was drawn through the drawplate at a constant speed of 1.25 inches per minute.

The number of pounds required to pull the wire through the drawplate was recorded.

The number of pounds required to pull wires composed of aluminum, copper and steel, respectively, through the drawplate, the lubricant additive, and the size of the wire before and after drawing, are tabulated above.

From the foregoing disclosure and examples, it is readily seen that the novel compositions herein set forth have unique and useful properties which are unlike the additive properties of the separate constituents.

While several particular embodiments of this invention are shown, it will be understood, of course, that the invention is not to be limited thereto, since many modifications may be made, and it is contemplated therefore by the appended claims, to cover any such modifications as fall within the true spirit and scope of this invention.

I claim:
1. A process for preparing an organically adducted magnesia which comprises refluxing in an organic solvent a lightly calcined magnesia having an iodine adsorption number of from 10 to 300 with a fatty acid selected from the group consisting of monobasic fatty acids containing from 4 to 26 carbon atoms, dimerized $C_{18}$ unsaturated fatty acids, trimerized $C_{18}$ unsaturated fatty acids and mixtures thereof to form an adduct containing between about 15 and 25% by weight of organic material.
2. The product of the process of claim 1.
3. The process according to claim 1 wherein the fatty acid is lauric acid.
4. The process according to claim 1 wherein the fatty acid is palmitic acid.
5. The process according to claim 1 wherein the fatty acid is stearic acid.
6. The process according to claim 1 wherein the fatty acid is oleic acid.

References Cited

Taranenko: Chemical Abstracts, vol. 57, p. 5562, col. C (1962).

MacArdle: The Use of Solvents, p. 8 (1925).

ALEX MAZEL, *Primary Examiner.*

J. A. NARCAVAGE, *Assistant Examiner.*